Figure 1:

June 29, 1965 H. SCHONHORN 3,192,092
BONDING TECHNIQUE
Filed July 9, 1962

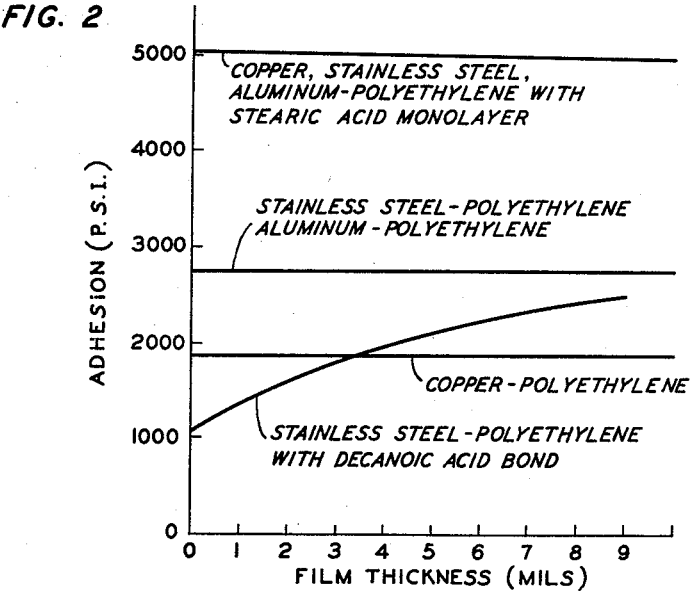
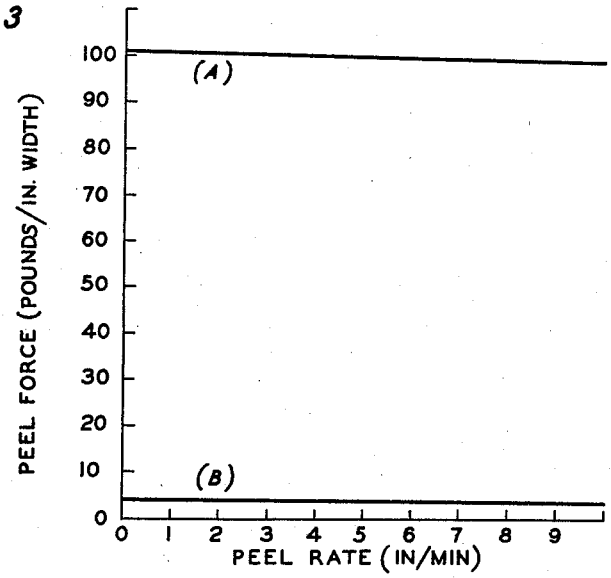
INVENTOR
H. SCHONHORN
BY Edward M. Fink
ATTORNEY

3,192,092
BONDING TECHNIQUE
Harold Schonhorn, New Providence, N.J., assignor to Bell
Telephone Laboratories, Incorporated, New York, N.Y.,
a corporation of New York
Filed July 9, 1962, Ser. No. 208,537
6 Claims. (Cl. 156—308)

This invention relates to a technique for bonding polar to nonpolar surfaces and to the bonded articles so produced. More particularly, the present invention relates to methods of bonding polar to nonpolar surfaces by means of an oriented monolayer adhesive.

The mechanical and electrical properties of materials having polar surfaces, such as metals, glasses, ceramics, etc., have led to their widespread use in the electronics industry for numerous purposes. It is often desirable, particularly in these electrical uses, to form a strong chemical bond between the polar surface and a nonpolar surface. Unfortunately, these materials are not ordinarily amenable to bonding.

Recognizing the need for suitable techniques for bonding such materials, early workers in the art developed methods for converting nonpolar surfaces to polar surfaces, thereby facilitating ultimate bonding to a polar surface. One such technique which uses devices for bonding polyethylene to a metal body involves flaming the surfaces (nonpolar) of the polyethylene, so resulting in a polar surface, and is described in United States Patent 2,715,077 granted on August 9, 1955.

In accordance with the present invention, a technique is described for bonding polar to nonpolar surfaces wherein the adsorption of compressed monomolecular layers of amphipathic (polar-nonpolar) molecules between selected surfaces affords a bonding phase evidencing a high degree of uniformity and bonding strengths not heretofore attained.

In a specific embodiment, the present invention is directed to a technique for bonding a typical material having a nonpolar surface, polyethylene, to various materials evidencing polar surfaces.

The invention will be more easily understood by reference to the accompanying drawing wherein:

FIG. 1 is a cross-sectional view of an article produced in accordance with the present inventive technique;

FIG. 2 is a graphical representation on coordinates of film thickness in mils (of remaining polyethylene) against adhesion in pounds per square inch showing the tensile strength of polyethylene-stainless steel, polyethylene-copper and polyethylene-aluminum bonds using exemplary bonding layers in accordance with this invention; and FIG. 3 is a graphical representation on coordinates of peel force in pounds per inch of width against film thickness in mils (of remaining polyethylene) showing the force required to peel polyethylene-aluminum bonds.

A general outline of the methods herein described and the ranges of operating parameters will now be given. The general discussion is directed to bonding polyethylene to metals and it will be appreciated that the technique described can be employed for bonding any polar to nonpolar surface.

The amphipathic substances which may be employed in the practice of this invention may be selected from any group of materials having molecules which evidence a polar and a relatively nonpolar end which, upon layering in monomolecular thickness upon the surface of a suitable liquid, will form a gas-liquid interface with the molecules of the gas randomly distributed. It will be understood that the amphipathic material is generally employed in the liquid state, however, upon layer in monomolecular thickness the distribution of the molecules is such as to satisfy the ideal gas laws and, for convenience, it is referred to as a gas. The application of a suitable lateral force to the monolayer, as determined from force-area isotherms, results in condensation of the gas and an oriented uniform distribution of the molecules. The principal forces holding the molecules in place in a condensed monolayer are threefold: Van der Waals' dispersion forces between adjacent chains, interaction of the polar group with the substrate and the external lateral pressure. When transferring the amphipathic monolayer to a solid substrate, assuming a 1:1 correspondence in transfer, the third factor disappears and leaves cohesion of the film to the Van der Waals' forces and to the anchoring of the polar group onto the surface of the substrate.

Typical materials suitable for this purpose, particularly for bonding polyolefins to metals, are water insoluble compounds selected from:

(a) Materials represented by the general formula $x(CH_2)_{12-22}COOY$ wherein $x$ is a $CH_3$ or $COOR$ radical, R representing an alkyl group, and wherein Y is hydrogen or a metal, (b) Materials represented by the general formula $CH_3(CH_2)_{13-23}Z$ wherein Z is either an amine, sulfate, phosphate or phosphonate radical.

The first step in the inventive technique involves preparing a dilute solution of the surface active material (amphipathic) in a suitable spreading agent such as benzene or hexane. This is done, for example, by dissolving 50.0 milligrams of the amphipathic material in 100 milliliters of reagent grade spreading solvent and storing until ready for use. The amphipathic materials are desirably highly purified and obtainable from commercial sources.

Next, the solution containing the amphipathic molecule is carefully layered onto the surface of a liquid contained in a suitable trough, for example, by means of an eye dropper or syringe, such liquid hereinafter being referred to as the trough substrate. The trough substrate is generally distilled water which has been deionized by passage through a mixed bed resin. In the alternative, a buffered salt solution might be substituted for the deionized water depending upon the metallic substrate being plated with the monolayer, for example, when transferring a monolayer of stearic acid to an aluminum substrate it is often helpful to utilize a trough substrate of aluminum chloride, or, in the case of copper, copper chloride, so forming a mixed monolayer on the surface of the solid substrate, such monolayer being comprised of aluminum or copper stearate, respectively, and stearic acid. Such action is accounted for by the interaction of the monolayer on the trough substrate with the salts. These salts, for example, chlorides, sulfates, nitrates and phosphates, are obtained from commercial sources and are of reagent grade.

Upon the application of the drop of amphipathic solution to the trough substrate, a spreading action results with the spreading solvent carrying a thin monomolecular layer across the trough substrate at the air-liquid interface. As a precautionary measure, it has been found helpful to sweep the trough surface several times with a hydrophobic barrier prior to the addition of the spreading solution in order to remove any surface contamination which would cause faulty deposition of the monomolecular layer. Prior to plating, the monolayer is permitted to stand for approximately five minutes in order to allow for solvent evaporation.

For each of the amphipathic materials employed it is necessary to determine the force-area isotherm, i.e., the minimum force required to be applied laterally to form an oriented condensed monolayer and the maximum force which may be applied without breaking the monolayer. These measurements can be made with a commercial Langmuir-Adam balance as described in "Physical Chemistry of Surface Films" by W. D. Harkins, Reinhold, New York, 1952. For the purposes of this invention it has been found suitable to apply a lateral force of the order of 30 dynes/cm. for the materials described.

A floating barrier constant film pressure device of the type described by Sher and Chanley in Review of Scientific Instruments, volume 26, page 266, 1955 may be employed as a means for obtaining the lateral force required to condense the monolayer. Briefly, this device comprises a floating barrier which contacts the trough substrate and serves as a dam for the monolayer, such barrier being attached to a pulley system on which weights corresponding to the desired pressure are applied.

The next step in the inventive procedure involves depositing or transferring the monolayer to a suitable solid substrate. The substrate may suitably be any material having a polar surface. Typical materials utilized for this purpose are, for example, aluminum, stainless steel, copper, bismuth, lead, tin and superconducting compositions such as $V_3Si$, etc. The selected substrate is initially cleaned by any conventional cleaning technique designed to produce hydrophillic oxides on the substrate surface, for example, in cleansing aluminum a sulfochromate treatment is employed. This method comprises heating the substrate in a solution of sulfuric acid and sodium dichromate at 65° C. for approximately seven minutes. The cleaned substrate is then mounted on a dipping device of the type described by Blodgett in Journal of the American Chemical Society, volume 57, page 1007, 1935, such device including a reversible motor which permits control of the rate of dipping.

The substrate is then dipped through the surface of the monolayer at a dipping rate of approximately 3 cm./minute and withdrawn at the same rate, so causing the transfer of the monolayer from the trough substrate to the solid substrate. After withdrawal the solid substrate is air dried in order to permit evaporation and drainage of water, such drying being accomplished in about 30 seconds after removal from the trough substrate.

Next, the solid substrate including the oriented condensed monolayer is placed upon a hot plate maintained at a temperature within the range of 125 to 205° C. for a time period within the range of 1 to 20 minutes depending on the bond strength desired. Prior to heating, a thermoplastic material, i.e., one which evidences the property of becoming plastic upon application of heat and which is nonpolar, is placed atop the monolayer. Suitable thermoplastic compounds have been found to be the polyolefins, particularly polyethylene and polypropylene, although it will be understood that any material having a nonpolar surface may be employed. Heating at temperatures beyond the indicated maximum or for time periods greater than 20 minutes results in a degradation of the polymer, whereas heating at temperatures below the indicated minimum or for time periods less than one minute results in a relatively weak bond and is not satisfactory for all purposes. Following the heating step, the resultant assembly is removed from the hot plate and cooled by air quenching or by quenching in ice water.

Several examples of the present invention are described in detail below. These examples are included merely to aid in the understanding of the invention, and variations may be made by one skilled in the art without departing from the spirit and scope of the invention.

*Example I*

The example illustrates the fabrication of an article comprising polyethylene and aluminum spaced from one another by an oriented condensed monolayer comprising stearic acid.

The stearic acid sample employed had a melting point of greater than 69.5° C. 50.0 milligrams of this material was dissolved in 100 milliliters of reagent grade benzene, a conventional spreading agent, and stored until ready for use.

A "Lucite" tray, approximately 30 x 30 x 1 centimeter and having a rectangular well 10 centimeters deep at one end was utilized as a trough, the trough being mounted on adjustable legs to allow for proper leveling. The surfaces of the trough were made hydrophobic prior to use in order to produce a monomolecular layer by rubbing with ferric stearate prepared by adding a suspension of 10 grams of sodium stearate in 100 grams of water to 200 milliliters of a concentrated solution of approximately one molar ferric chloride, the resultant solution being mixed overnight and filtered the next morning, so resulting in the precipitation of solid ferric stearate.

Water, deionized by passage through a mixed bed resin was slowly admitted to the trough, so providing a trough substrate. Next, the trough substrate was swept several times with a hydrophobic barrier. A floating barrier constant film pressure device as described above was then set up with the barrier positioned 10 centimeters from the end of the trough. Following, the stearic acid solution was carefully layered onto the trough substrate by means of a syringe, so forming a monomolecular layer at the air-liquid interface which was permitted to stand for five minutes.

The substrate selected for deposition or transfer of the monolayer was an aluminum (Alclad 2024-T3) rectangular plate 5 x 1 x 1/16 inch, such substrate having been cleaned by heating at 65° C. for seven minutes in a solution of sulfuric acid and sodium dichromate.

The solid substrate was affixed to the chuck of a constant dipping device of the type described above and with a lateral pressure of 30 dynes/cm. applied to the monolayer was dipped through the surface thereof at a rate of 3 cm./minute to a depth of 5 centimeters and withdrawn at the same rate. The substrate was then air dried for 30 seconds and placed upon a hot plate.

Polyethylene (Marlex 5003) having a melt index of 0.3 and a density of 0.95 g./cm.³ was selected as a thermoplastic material and shaped into rectangular plates 5 x 1 x 1/16 inch.

The polyethylene was carefully placed atop the monolayer, the hot plate heated to a temperature of 175° C. for 10 minutes and the resultant assembly cooled by quenching in air. The completed article was aged for 24 hours and peeled at 180° C. according to ASTM D903-49 with the exception that a crosshead separation rate of 2 inches/minute was employed. The polyethylene-aluminum article evidenced a resistance to peel of 82 pounds per inch of width.

*Example IA*

The procedure of Example I was repeated with the exception that a $C_{16}$ sulfate and a $C_{18}$ phosphonate were employed as the monolayer. The polyethylene-aluminum articles evidenced a resistance to peel of 80 pounds per inch of width in both instances.

*Example II*

The procedure of Example I was repeated with the exception that copper and stainless steel were employed as the solid substrates. The resultant articles evidenced a resistance to peel of 82 pounds per inch of width.

*Example III*

The monolayer transfer technique of Example I was repeated with the exception that two aluminum plates (2024–T4) were employed as solid substrates. The bonding was effected in a device designed to provide a ½ inch overlap between the substrates, a fine gold wire 0.003 inch in diameter being interposed between the aluminum substrates in order to maintain a polyethylene glueline of constant thickness. In order to obtain maximum bond strength the polyethylene was abraded mildly to expose the bulk phase followed by a rinse in hot acetone. Sections of abraded polyethylene 1 x ½ inch were placed over the metal substrates and bonded at 177° C. for 5 minutes. The two substrates were then joined together in a tensile shear bonding jig at 177° C. for 30 p.s.i. for 20 minutes. The bonded specimen was tested for tensile shear in accordance with ASTM Designation D1002, except that they were pulled apart at 0.1 inch/minute. The completed article evidenced a tensile shear strength of 1561 pounds per square inch.

*Example IV*

The procedure of Example III was repeated employing copper and stainless steel substrates. The resultant articles evidenced a tensile shear strength of 1561 pounds per square inch.

*Example V*

The procedures of Examples III and IV were repeated with the exception that the trough substrate consisted of an 0.0005 molar aluminum chloride solution for the aluminum-polyethylene bonding, and a copper chloride and chromium chloride solution, respectively, for the copper and stainless steel-polyethylene bonding. The tensile shear strength of the resultant article was 1810 pounds per square inch.

*Example VI*

The procedure of Example III was repeated with the exception that the monolayer consisted of octadecylamine or the ethyl half ester of octadecanedioic acid. The tensile shear strengths of the resultant articles were 1683 and 1408 pounds per square inch, respectively.

*Example VII*

The procedure of Example VI was repeated with the exception that the trough substrate consisted of an 0.0005 molar solution of aluminum chloride. The tensile shear strength of the resultant article was 1561 pounds per square inch.

*Example VIII*

The procedure of Examples I and II was repeated with the exception that polypropylene was substituted for polyethylene. The resultant article evidenced a strong bond which was not destroyed by the fingernail test.

*Example IX*

The procedure of Example V was repeated with the exception that glass was substituted for the aluminum. The resultant article evidenced a strong bond which was not destroyed by the fingernail test.

With reference now more particularly to FIG. 1 there is shown an article prepared in accordance with the present inventive technique. Shown in the figure is an aluminum substrate 11 having deposited thereon stearic acid monolayer 12. The article is completed by polyethylene layer 13.

FIG. 2 is a graphical representation showing a comparison between prior art bonding methods and those described herein from a standpoint of tensile strength of various bonded articles.

Tensile strengths for the polyethylene-stainless steel system were determined by means of ASTM-D897-49(c) except that the surfaces were 1.5 inches long, 0.5 inch diameter rods with 0.25 inch diameter hole drilled in them at a point 0.5 inch from the end for purposes of mounting in the tensile machine. The samples were prepared by heating polyethylene-stainless steel assemblies with and without a stearic acid monolayer plated on the metal at 30 dynes/cm. at 175° C. for 10 minutes. A comparison was also made with the data obtained by prior workers in bonding polyethylene to stainless steel by means of a decanoic acid multilayer in accordance with conventional prior art methods. As noted from the graph, the use of a decanoic acid multilayer reduces tensile strength from approximately 2750 pounds per square inch to values ranging from 1050–2500 pounds per square inch as compared to a conventional polyethylene-stainless steel bond. However, the application of the described technique results in tensile strengths which are of the order of 5000 pounds per square inch, a significant improvement over the prior art methods. Further proof of the superiority of the inventive technique over prior art work may be noted from a comparison of aluminum-polyethylene and copper-polyethylene bonding with and without a monolayer. Again, it is noted that an improvement in tensile strength of the order of 2 magnitudes is obtained.

FIG. 3 is a graphical representation showing a comparison of peel test for polyethylene-aluminum articles produced in accordance with the procedure described in Example I above (Curve A) and in the absence of the stearic acid monolayer (Curve B). It is clearly evident from the graph that the peel force for the prior art material is approximately 4 pounds per inch of width as compared to a value of 100 pounds per inch of width for the materials produced by the described technique.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of this invention, reference being had to the appended claims.

What is claimed is:
1. The method of forming a seal between a metal body and a polyolefin which comprises the steps of dipping said metal body through the surface of an oriented compressed layer of monomolecular thickness consisting essentially of an amphipathic material selected from the group consisting of:
 (a) compounds represented by the general formula $x(CH_2)_{12-22}COOY$ wherein $x$ is selected from the group consisting of $CH_3$ and COOR radicals, R represents an alkyl group and wherein Y is selected from the group consisting of metals and hydrogen, and
 (b) compounds represented by the general formula $CH_3(CH_2)_{13-23}$—X wherein Z is selected from the group consisting of amine, sulfate, phosphate and phosphonate radicals, withdrawing said metal body, placing said polyolefin thereon and heating the resultant assembly at a temperature within the range of 125–205° C. for a time period within the range of 1–20 minutes, thereby forming a seal between said metal body and said polyolefin.

2. The method according to the procedure of claim 1 wherein said polyolefin is polyethylene and wherein said metal body is aluminum.

3. The method according to the procedure of claim 2 wherein said layer is stearic acid.

4. The method of forming a seal between polyethylene and aluminum which comprises the steps of dipping an aluminum substrate through the surface of an oriented condensed layer of monomolecular thickness consisting essentially of stearic acid, said layer being contained within a suitable container, and in contact with a liquid substrate, withdrawing said aluminum substrate from beneath the surface of said layer, placing polyethylene in contact with the said aluminum substrate having deposited thereon the said layer and heating the resultant assembly at 175° C. for 10 minutes, thereby forming a seal between said polyethylene and said aluminum.

5. The method according to the procedure of claim 4 wherein said liquid substrate is deionized water.

6. The method according to the procedure of claim 4 wherein said liquid substrate is an 0.0005 molar solution of aluminum chloride.

References Cited by the Examiner

UNITED STATES PATENTS

| | | | |
|---|---|---|---|
| 1,883,973 | 10/32 | Kurtz | 156—306 X |
| 1,919,718 | 7/33 | Gray | 156—326 X |
| 2,354,011 | 7/44 | Gross | 156—326 X |
| 2,604,423 | 7/52 | Slotterbeck et al. | 161—216 |
| 2,838,437 | 6/58 | Froemming et al. | 156—334 X |

OTHER REFERENCES

Blodgett: Journal of The American Chemical Society, vol. 57, pp. 1020, 1021, 1935.

EARL M. BERGERT, *Primary Examiner.*